United States Patent
Melody et al.

(10) Patent No.: US 7,248,462 B2
(45) Date of Patent: Jul. 24, 2007

(54) METHOD OF ANODIZING VALVE METAL DERIVED ANODE BODIES AND ELECTROLYTE THEREFORE

(75) Inventors: Brian John Melody, Greer, SC (US); John Tony Kinard, Greer, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 16 days.

(21) Appl. No.: 11/193,903

(22) Filed: Jul. 29, 2005

(65) Prior Publication Data
US 2006/0000707 A1    Jan. 5, 2006

Related U.S. Application Data

(62) Division of application No. 10/462,973, filed on Jun. 17, 2003.

(51) Int. Cl.
*H01G 9/04* (2006.01)
*H01G 9/145* (2006.01)

(52) U.S. Cl. .................. 361/528; 361/508

(58) Field of Classification Search ............. 361/508, 361/509, 528, 529
See application file for complete search history.

(56) References Cited

U.S. PATENT DOCUMENTS

| | | | |
|---|---|---|---|
| 3,138,746 A | 6/1964 | Burger et al. .......... 317/230 |
| 3,547,423 A | 12/1970 | Jenny et al. .......... 361/504 |
| 4,692,224 A | 9/1987 | Bernard et al. ........ 204/56.1 |
| 4,812,951 A | 3/1989 | Melody et al. ......... 361/504 |
| 5,185,075 A | 2/1993 | Rosenberg et al. ..... 205/234 |
| 5,716,511 A | 2/1998 | Melody et al. ......... 205/324 |
| 6,235,181 B1 * | 5/2001 | Kinard et al. ......... 205/148 |
| 6,480,371 B1 | 11/2002 | Kinard et al. ......... 361/508 |

FOREIGN PATENT DOCUMENTS

| | | |
|---|---|---|
| GB | 2168383 | 6/1989 |
| WO | 02/45104 | 6/2002 |

OTHER PUBLICATIONS

International Search Report, PCT/US2004/017971, Haering C., Nov. 30, 2004.
Fessenden, R. J.; Fessenden, J.S. Organic Chemistry, 4th Ed. Brooks/Cole Publishing Company, Pacific Grove, California, 1990, pp. 213 and 316.

* cited by examiner

*Primary Examiner*—Eric W. Thomas
(74) *Attorney, Agent, or Firm*—Joseph T. Guy; Nexsen Pruet, LLC

(57) ABSTRACT

An electrolyte solution for anodizing a metal and a capacitor comprising the anodized metal. The electrolyte comprises more than about 5%, by weight, and less than about 30%, by weight, water; about 0.1 to 20%, by weight, ionogen and an aprotic polar solvent. The ionogen comprises phosphoric acid and an alkanol amine in an amount, and ratio, sufficient to maintain a pH of about 4 to about 9.

19 Claims, No Drawings

METHOD OF ANODIZING VALVE METAL DERIVED ANODE BODIES AND ELECTROLYTE THEREFORE

CROSS-REFERENCE TO RELATED APPLICATION

The present invention is a divisional application of U.S. patent application Ser. No. 10/462,973 filed Jun. 17, 2003 which is pending.

BACKGROUND OF THE INVENTION

The present invention relates to an electrolyte for anodizing valve metals and a method utilizing the same.

With the introduction of tantalum "wet slug" capacitors in the 1940's, the use of aqueous phosphoric acid anodizing solutions, operated at 80-90° C., rapidly became the industry standard. These solutions are particularly suitable for anodizing tantalum powder metallurgy anode bodies, which are the basis of these capacitors. Phosphoric acid anodizing provides superior properties to the dielectric films. It is known that the presence of phosphate in the anodic oxide dielectric, from the anodizing solution, greatly reduces the mobility of oxygen through the oxide. The decreased mobility minimizes oxygen migration into the substrate resulting in a more stable dielectric than that achieved in the absence of phosphate. By about 1960, aqueous ethylene glycol solutions of dilute phosphoric acid containing 10-60% ethylene glycol had replaced aqueous phosphoric acid for the anodizing of tantalum powder metallurgy capacitor anode bodies, particularly at higher anodizing voltages. Enhancements in dielectric properties are obtained with ethylene glycol present in the anodizing solution.

The action of the ethylene glycol in producing superior dielectric quality appears to be quite complex. The presence of ethylene glycol may modify the boiling point of the electrolyte, the resistivity versus temperature response of the electrolyte, as well as the ultimate sparking voltage of the electrolyte. Secondary ion mass spectroscopy (or "SIMS" analysis) of anodic oxide films grown on tantalum in aqueous ethylene glycol/dilute phosphoric acid indicates the presence of carbon in these films. The difficulties encountered in the analysis of anodic oxide films have so far prevented the identification of the carbon species present in the glycol/phosphate formed films. The carbon species may be present as a glycol phosphate ester, a glycol oxidation product such as oxalate, formate or carbonate, or some as yet unanticipated species. The great stability of the incorporated carbon species during the heat treatment at temperatures of from about 250° C. to about 450° C. strongly suggests that the incorporated species is carbonate. A more definitive answer awaits more sensitive methods of oxide film analysis. A second anodizing step typically follows the heat treatment to further enhance oxide stability.

U.S. Pat. No. 5,716,511 describes a method, and electrolyte, for producing anodic films on tantalum and other valve metal bodies for the purpose of minimizing the number of flaws in the resulting dielectric films. These electrolytes are usually employed at temperatures below about 50° C. The minimum water content of the electrolyte is necessary for reasonable uniform anodic oxide formation throughout the bulk of tantalum powder metallurgy compacts of about 30%. This is consistent with the ethylene glycol containing electrolytes. Below approximately 30% water content, the anodizing is found to take place largely near the outer surfaces of the anode bodies with the interiors of the anode bodies remaining largely unanodized unless extremely long hold times at voltage (+48 hours) are employed.

U.S. Pat. No. 6,480,371 describes the use of anodizing solutions containing akanolamines and phosphoric acid for the purpose of maximizing the possible anodizing voltage and minimizing the deposition of polyphosphates within the anode bodies. The use of alkanolamine/phosphoric acid mixtures in combination with the aqueous polyethylene glycol dimethyl ethers, as described in U.S. Pat. No. 5,716,511, has been found to yield particularly stable dielectric films. The electrolytes resulting from the combination of the solvents of U.S. Pat. No. 5,716,511 and the ionogens of U.S. Pat. No. 6,480,371 still require a minimum water content of approximately 30% water for proper, uniform, anodizing within the bodies of powder metallurgy anodes.

United Kingdom Patent Application No. GB 2,168,383 describes a method for anodizing a wide variety of valve metals using polar, aprotic solvent solutions of phosphoric acid, or electrolyte and water-soluble phosphates, containing less than 2% water. For many valve metals, these electrolytes give the best results when operated below about 30° C. and at a current density of about 1 milliampere/$cm^2$ or less. U.S. Pat. No. 5,185,075 extends the water content of the solutions described in GB 2,168,383, and the operating temperature to 50° C. or less for the anodizing of 99.997% pure titanium. Neither the solvents described in GB 2,168,383 or the variation described in U.S Pat. No. 5,185,075 are generally suited for use in the anodizing of powder metallurgy anodes. At the low water content of the electrolytes of these patents the internal portions of the anodes are not uniformly anodized by phosphoric acid/aprotic polar solvent solutions.

It is known that certain polar aprotic solvents have a tendency to form complexes with protonated amines. The complexes yield non-aqueous solutions which are more electrically conductive than solutions containing the same amine and acid but in a non-aqueous solvent which does not form strong complexes with protonated amines. Examples of polar, aprotic solvents which form complexes with protonated amines include N-alkyl amides, such as dimethyl formamide. Examples of polar, aprotic solvents which have a much lower tendency to form complexes with protonated amines include N-methyl-2-pyrrolidone, N-ethyl-2-pyrrolidone, 4-butylrolactone, propylene carbonate, tetramethyl urea, and sulfolane (tetramethylene sulfone). One member of the group of solvents which form complexes with protonated amines is dimethyl sulfoxide. The tendency of dimethyl sulfoxide to form complexes with protonated amines is sufficiently great that dimethyl sulfoxide has been employed as a component of working or fill electrolytes for electrolytic capacitors. U.S. Pat. No. 4,812,951 describes the effects of substituting 25% dimethyl sulfoxide for an equivalent amount of primary capacitor solvent. The result is a reduction in the low temperature resistivity and a minimization of the change in resistivity of the electrolyte with changing temperatures.

BRIEF SUMMARY OF THE INVENTION

It is an object of the present invention to provide an electrolyte for anodizing valve metals and a method utilizing same.

It is another object of the present invention to provide an aqueous electrolyte suitable for anodizing a valve metal without minimizing anodization of the anode interior.

A particular feature is the ability to anodize at higher pH without decreasing the effectiveness while still incorporating phosphate in the oxide layer.

Another particular feature is the ability to incorporate phosphate in the oxide layer without excessive polyphosphate depositions.

These and other advantages, as would be realized to one of ordinary skill in the art, are provided in an electrolyte solution for anodizing a metal and a capacitor comprising the anodized metal. The electrolyte comprises more than about 5%, by weight, and less than about 30%, by weight, water; about 0.1 to 20%, by weight, ionogen and an aprotic polar solvent. The ionogen comprises phosphoric acid and an alkanol amine in an amount, and ratio, sufficient to maintain a pH of about 4 to about 9.

Another embodiment is provided in a method for anodizing an anode comprising the steps of:
a) providing a valve metal;
b) placing the valve metal in an electrolyte comprising:
more than about 5%, by weight, and less than about 30%, by weight, water;
about 0.1 to 20%, by weight, ionogen comprising:
phosphoric acid; and
an alkanol amine wherein the amount of ionogen is sufficient to maintain a pH of about 4 to about 9; and
an aprotic polar solvent; and
c) subjecting the valve metal to an anodizing voltage.

Yet another embodiment is provided in
A capacitor formed by the process of:
a) providing a valve metal;
b) placing the valve metal in an electrolyte comprising:
more than about 5%, by weight, and less than about 30%, by weight, water;
about 0.1 to 20%, by weight, ionogen comprising:
phosphoric acid; and
an alkanol amine wherein the amount of ionogen is sufficient to maintain a pH of about 4 to about 9; and
an aprotic polar solvent;
c) subjecting the valve metal to an anodizing voltage to form an anodized anode; and
d) forming a capacitor with the anodized anode.

DETAILED DESCRIPTION OF THE INVENTION

The inventors of the present application have developed, through diligent research, an aqueous anodizing solution suitable for use at a pH of 4-9 comprising alkanol amine and an aprotic polar solvent. The inventors have also developed an improved method for anodizing an anode utilizing the inventive anodizing solution.

For certain anodizing applications it is desirable to employ anodizing solutions having a water content below approximately 30%. This is particularly the case with higher voltage anodizing of niobium or niobium suboxide powder metallurgy anodes or the higher voltage anodizing of powder metallurgy tantalum anodes fabricated from very fine tantalum powders. The higher water amount is required for uniform anodic oxide growth within the interstices of powder metallurgy anodes with the traditional organic solvents used in anodizing electrolytes, such as ethylene glycol, diethylene glycol, polyethylene glycol 300, tetraethylene glycol dimethyl ether, etc. For the anodizing applications mentioned above, it is generally desirable to conduct the anodizing at temperatures below about 50° C. in order to minimize reactivity and flaw initiation in the anodic oxide films. As stated above, it is very difficult to obtain uniform anodic oxide growth within powder metallurgy anode bodies with an electrolyte water content below about 30% water, this tendency to form non-uniform anodic oxide films within powder metallurgy anode bodies is greatly aggravated at lower anodizing temperatures. The undesirable deposition of polyphosphates within the interstices of powder metallurgy anode bodies is also worsened by the use of low water content electrolytes containing phosphoric acid as the ionogen and operated at temperatures below about 80° C.

We have found that organic solvent solutions of phosphoric acid may be adjusted to higher pH, i.e. the more nearly neutral pH range of 4-9 which is useful for anodizing acid-sensitive substrates, via the addition of certain amines to the solution of phosphoric acid in organic solvents without precipitation of the amine phosphate salts. More preferably the pH is about 6 to about 8.

The alkanol amines which we have found to give the best results include monoethanol amine, diethanol amine, triethanol amine, ethyl diethanolamine, diethyl ethanolamine, dimethyl ethanolamine and dimethyl ethoxy ethanolamine (dimethyl amino ethoxy ethanol). These solvents provide resistance to precipitation at high concentrations with phosphoric acid in organic solvent solutions. Most preferred are dimethyl ethanolamine and dimethyl ethoxy ethanolamine.

The phosphoric acid and alkanol amine are taken together to represent the ionogen. The ratio of phosphoric acid amount to alkanol amine amount is determined based on the pH to be achieved. The amount of alkanol amine is preferably increased for lower resistivity within the constraints of pH. Preferably, the total amount of ionogen represents at least about 0.1 to about 20%, by weight, of the total electrolyte. Preferably, the ionogen represents about 0.1 to about 15%, by weight, of the total electrolyte. In a particularly preferred embodiment the phosphoric acid is present in an amount of about 0.5 to about 5%, by weight, based on the total electrolyte. In a particularly preferred embodiment the alkanol amine is present in an amount of about 0.5 to about 7%, by weight, based on the total electrolyte.

Unfortunately, solutions of phosphoric acid and alkanol amines, such as dimethyl ethanolamine or dimethyl ethoxy ethanolamine, in most organic solvents are not useful for anodizing powder metallurgy anode compacts unless a minimum of about 30% water is present in the solution. Below about 30% water concentration non-uniform oxide growth occurs.

We have found that polar aprotic solvents which have a strong tendency to form complexes with protonated amines, for example, lower N-alkyl amides (such as dimethyl formamide), and especially dimethyl sulfoxide, may be used as the solvent portion of anodizing electrolytes containing phosphoric acid in combination with alkanol amines as the ionogen. The ionogens are more ionized in these electrolytes. Increased ionization results in greater conductivity within the interstices of powder metallurgy anodes. This greater ionization of the amine/phosphoric acid ionogen within the interstices of powder metallurgy, or other porous anode bodies, anodized in the electrolyte of the present invention makes possible a reduction in the water content of the electrolyte to levels below the 30% minimum necessary with conventional anodizing solvents, such as ethylene glycol. We have found that the water content of the electrolyte should be greater than about 5% in order to insure uniform oxide formation within the interstices of porous anode bodies such as powder metallurgy anode bodies.

For the purpose of the present invention, the water content of the electrolyte refers to the free or uncombined water, not to the combined water content of the phosphoric acid content of the electrolyte. Phosphoric acid may be considered to be a chemical combination of phosphorous oxide and water. By way of example, one equivalent of $P_2O_5$ may be combined with 3 equivalents of water to yield 2 equivalents of phosphoric acid, $H_3PO_4$. The water contained in the phosphoric acid molecules is not considered as solution water for the purposes of this invention.

The anode is a valve metal preferably chosen from titanium, tungsten, chromium, aluminium, zirconium, hafnium, zinc, vanadium, niobium, tantalum, bismuth, antimony and mixtures, alloys and metallic glass compositions thereof. Tantalum is the most preferred anode.

The cathode is a conductive metal provided with a semiconductive or pseudoconductive coating. The coating can be an oxide, nitride, carbide or carbon nitride. Suitable cathode metals include tantalum, titanium, nickel, iridium, platinum, palladium, gold, silver, cobalt, molybdenum, ruthenium, manganese, tungsten, iron, zirconium, hafnium, rhodium, vanadium, osmium and niobium. A particularly preferred cathode electrode comprises a porous ruthenium oxide film provided on a titanium substrate.

EXAMPLE 1

An electrolyte solution was prepared containing: 180 grams of dimethyl sulfoxide; 30 grams of de-ionized water; 10 grams of 85% phosphoric acid comprising 1.5 grams of water and 10 grams of dimethyl ethanolamine. The pH was measured with Hydrion paper to be about 6-7. The resistivity, at 1 kHz, was measured to be about 1,090 ohm-cm @29° C. and the water content was determined to be about 13.7%, by weight.

This electrolyte solution was placed in a 250 ml stainless steel beaker, which served as the cathode connection.

An anode was fabricated from H. C. Starck QR-12 tantalum powder, weighing 1.91 grams and from a group of anodes having a CV product of 4,200 microcoulombs (i.e., microfarad-volts) after anodizing to 150 volts in dilute phosphoric acid at 80° C., was anodized to 50 volts in the above solution at approximately 25° C., at a current of 20 milliamperes. The anode was held at voltage for about 7.5 hours. The anode was then rinsed, dried and the capacitance was measured in an aqueous dibasic potassium phosphate solution.

The capacitance was found to be 100.5 microfarads. One may calculate the 80° C. equivalent of the 50 volt anodizing voltage at 25° C. using the Torrisi relation $V_1T_1=V_2T_2$, wherein V is the anodizing voltage and T is the temperature (Kelvin) of the anodizing electrolyte. Thus for the present example, 50 volts at 25° C. is equivalent to 42 volts at 80° C.

The CV for the anode after anodizing in an electrolyte of the present invention is then calculated as 42 volts multiplied by 101.5 microfarads the product of which is 4263 microfarad-volts. This is in close agreement with the 4,200 CV found for this lot of anodes via phosphoric acid anodization. The anode was uniformity anodized internally.

EXAMPLE 2

An additional anode from the same lot used in Example 1 was anodized in the same electrolyte as in Example 1. In this case, the anode was anodized to 125 volts at 20 milliamperes and at 25° C. The anode was held at voltage for about 19 hours. The anode was then rinsed, dried, and the capacitance was measured as in Example 1. The capacitance was found to be 38.95 microfarads.

Again, using the Torrisi relation, 125 volts at 25° C. is equivalent to 105.9 volts at 80° C. The CV product is then calculated to be the multiplicative product of 38.95 microfarads and 105.9 volts which is 4125 CV. This is in good agreement with the 4,200 CV found for this anode lot formed in dilute phosphoric acid. The anode was uniformly anodized internally.

EXAMPLE 3

A higher voltage capability electrolyte was formulated as follows: 900 ml dimethyl sulfoxide; 100 ml deionized water; 13.0 grams of 85% phosphoric acid comprising 2 grams of water; and 10.5 grams of dimethyl ethanolamine. The pH was measured to be about 6 with Hydrion paper. The resistivity, at 1 kHz, was determined to be about 2,400 ohm-cm @23° C. and the water content was about 10%, by weight.

An anode from the same lot as used in Examples 1 and 2 was anodized to 240 volts at 25° C. The anode was then held at voltage for approximately 21 hours. The anode was then rinsed, dried, and the capacitance was found to be 20.2 microfarads. Again, using the Torrisi relation, 240 volts at 25° C. is equivalent to about 203.4 volts.

The CV is then found as the multiplicative product of 20.2 microfarads and 203.4 volts to be about 4,109 microfarad-volts. This is in excellent agreement with the 4,200 CV for this anode lot with dilute, 80° C. phosphoric acid anodized to 150 volts.

The CV products at various voltages for Examples 1-3 are provided in Table 1.

TABLE 1

| 80° C. Voltage Equivalent | Capacitance | CV Product |
|---|---|---|
| 42 volts | 101.5 μF | 4,263 μF-V |
| 105.9 volts | 38.95 μF | 4,125 μF-V |
| 203.4 volts | 20.2 μF | 4,109 μF-V |

EXAMPLE 4

To illustrate the utility of the lower N-alkyl amides an electrolyte was prepared comprising 180 grams of dimethyl formamide; 20 grams of de-ionized water, 10 grams of 85% phosphoric acid comprising 1.5 grams of water; and 13.3 grams of dimethyl ethoxy ethanolamine. The pH was measured at about 6-7 with Hydrion paper. The resistivity, at 1 kHz, was about 1,250 ohm-cm @32° C. and the water content was about 9.6%, by weight.

An anode from the same lot as used for Examples 1-3 was anodized at 50 volts at a current of 20 milliamperes and at a temperature of 21° C. The anode was held at voltage for a period of nearly 5 hours. The anode was then rinsed in de-ionized water, dried and the capacitance was measured in aqueous dibasic potassium phosphate solution. The measured capacitance value was 100.3 microfarads. Using the Torrisi relation, 50 volts at 21° C. is equivalent to about 41.6 volts at 80° C. The CV is then found to be the multiplicative product of 100.3 microfarads and 41.6 volts or about 4,172 microfarad-volts. Again, this is in close agreement with the 4,200 μF-V per anode CV value for this lot as determined by anodizing 150 volts at 80° C. in dilute phosphoric acid.

Thus the inventors have found that the strong tendency of lower N-alkyl amides and dimethyl sulfoxide to form complexes with protonated amines may be exploited to prepare anodizing electrolytes containing above about 5% water and below about 30% water, useful for the anodizing of porous anode bodies, at temperatures below about 50° C.

The invention has been described with particular emphasis on the preferred embodiments. It would be realized from the teachings herein that other embodiments, alterations, and configurations could be employed without departing from the scope of the invention which is more specifically set forth in the claims which are appended hereto.

The invention claimed is:

1. An anode anodized by the electrolyte comprising:
more than about 5%, by weight, and less than about 30%, by weight, water; about 0.1 to 20%, by weight, ionogen comprising:
phosphoric acid; and
an alkanol amine wherein the amount of ionogen is sufficient to maintain a pH of about 4 to about 9; and
an aprotic polar solvent.

2. An anode of claim 1 comprising a valve metal selected from titanium, tungsten, chromium, aluminium, zirconium, hafnium, zinc, vanadium, niobium, tantalum, bismuth, antimony and mixtures, alloys and metallic glass compositions thereof.

3. The anode of claim 2 wherein saidanode comprises tantalum.

4. A capacitor comprising the anode of claim 3.

5. An anode anodized by the method of:
providing a valve metal;
placing said valve metal in an electrolyte comprising:
more than about 5%, by weight, and less than about 30%, by weight, water;
about 0.1 to 20%, by weight, ionogen comprising:
phosphoric acid; and
an alkanol amine wherein the amount of ionogen is sufficient to maintain a pH of about 4 to about 9; and
an aprotic polar solvent; and
subjecting said valve metal to an anodizing voltage.

6. The anode of claim 5, wherein said valve metal is selected from titanium, tungsten, chromium, aluminium, zirconium, hafnium, zinc, vanadium, niobium, tantalum, bismuth, antimony and mixtures, alloys and metallic glass compositions thereof.

7. The anode of claim 6, wherein said valve metal comprises tantalum.

8. A capacitor comprising the anode of claim 7.

9. A capacitor formed by the process of:
providing a valve metal;
placing said valve metal in an electrolyte comprising:
more than about 5%, by weight, and less than about 30%, by weight, water;
about 0.1 to 20%, by weight, ionogen comprising:
phosphoric acid; and
an alkanol amine wherein the amount of ionogen is sufficient to maintain a pH of about 4 to about 9; and
an aprotic polar solvent; and
subjecting said valve metal to an anodizing voltage to form an anodized anode;
forming a capacitor with said anodized anode.

10. The capacitor of claim 9 wherein said alkanol amine is selected from monoethanol amine, diethanol amine, triethanol amine, ethyl diethanolamine, diethyl ethanolamine, dimethyl ethanolamine and dimethyl ethoxy ethanolamine.

11. The capacitor of claim 10 wherein said alkanol amine is selected from dimethyl ethanolamine and dimethyl ethoxy ethanolamine.

12. The capacitor of claim 9 wherein said aprotic polar solvent comprises an N-alkyl amide.

13. The capacitor of claim 12 wherein said N-alkyl amide is selected from dimethyl formamide and dimethyl acetamide.

14. The capacitor of claim 13 wherein said aprotic polar solvent comprises dimethyl sulfoxide.

15. The capacitor of claim 9 wherein said electrolyte comprises about 0.1 to about 15%, by weight, ionogen.

16. The capacitor of claim 15 wherein said electrolyte comprises about 0.5 to about 5%, by weight, phosphoric acid.

17. The capacitor of claim 15 wherein said electrolyte comprises about 0.5 to about 7%, by weight, said alkanol amine.

18. The capacitor of claim 9 wherein said valve metal is selected from titanium, tungsten, chromium, aluminium, zirconium, hafnium, zinc, vanadium, niobium, tantalum, bismuth, antimony and mixtures, alloys and metallic glasses thereof.

19. The capacitor of claim 18 wherein said valve metal comprises tantalum.

* * * * *